Oct. 10, 1961  E. R. WAINSHILBAUM  3,004,255
GATE CIRCUITS
Filed Oct. 21, 1955  4 Sheets-Sheet 2

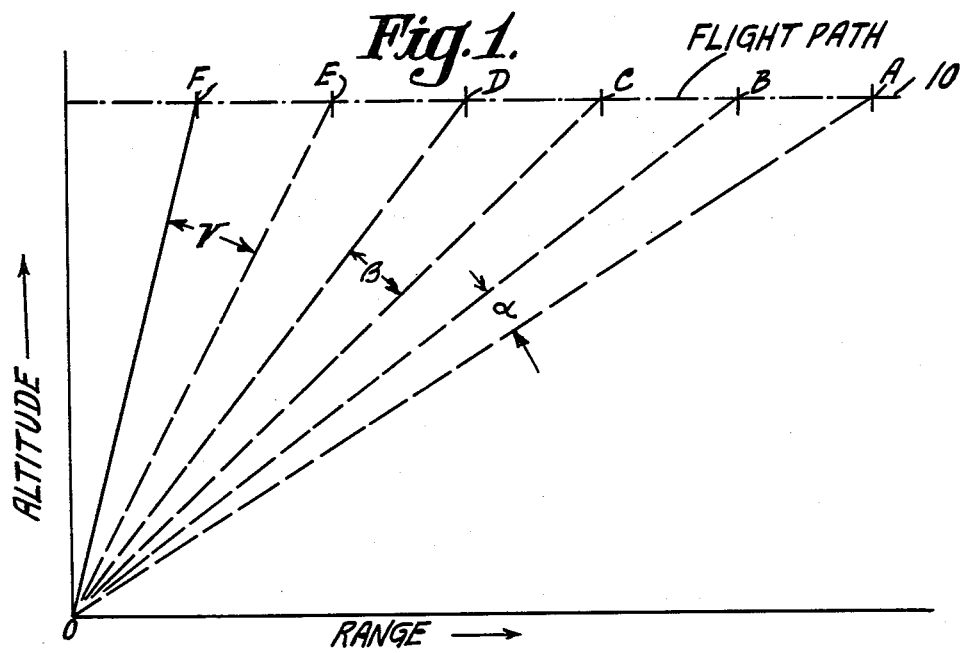
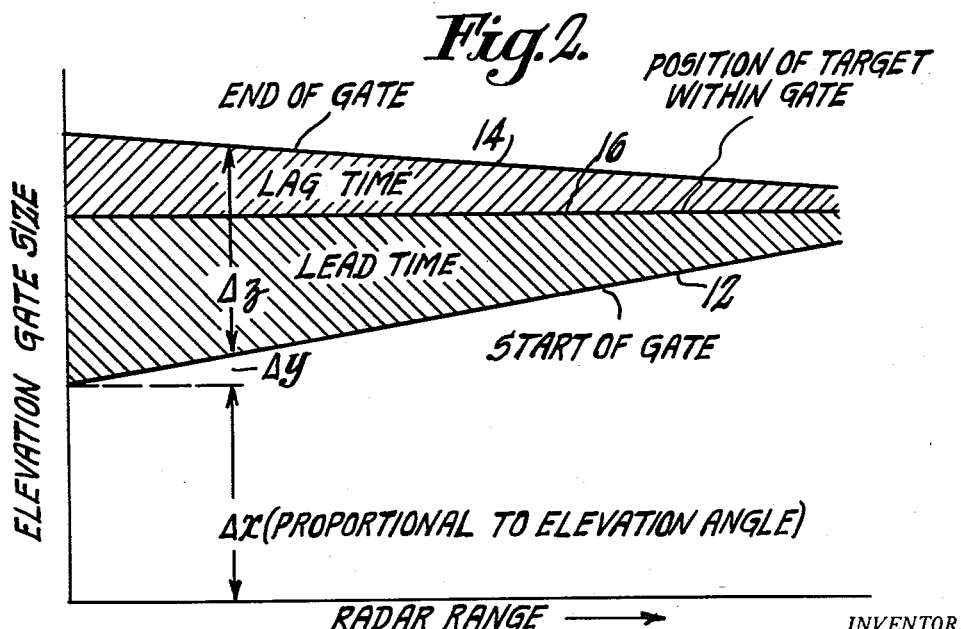

INVENTOR
EDWARD R. WAINSHILBAUM
BY
ATTORNEY

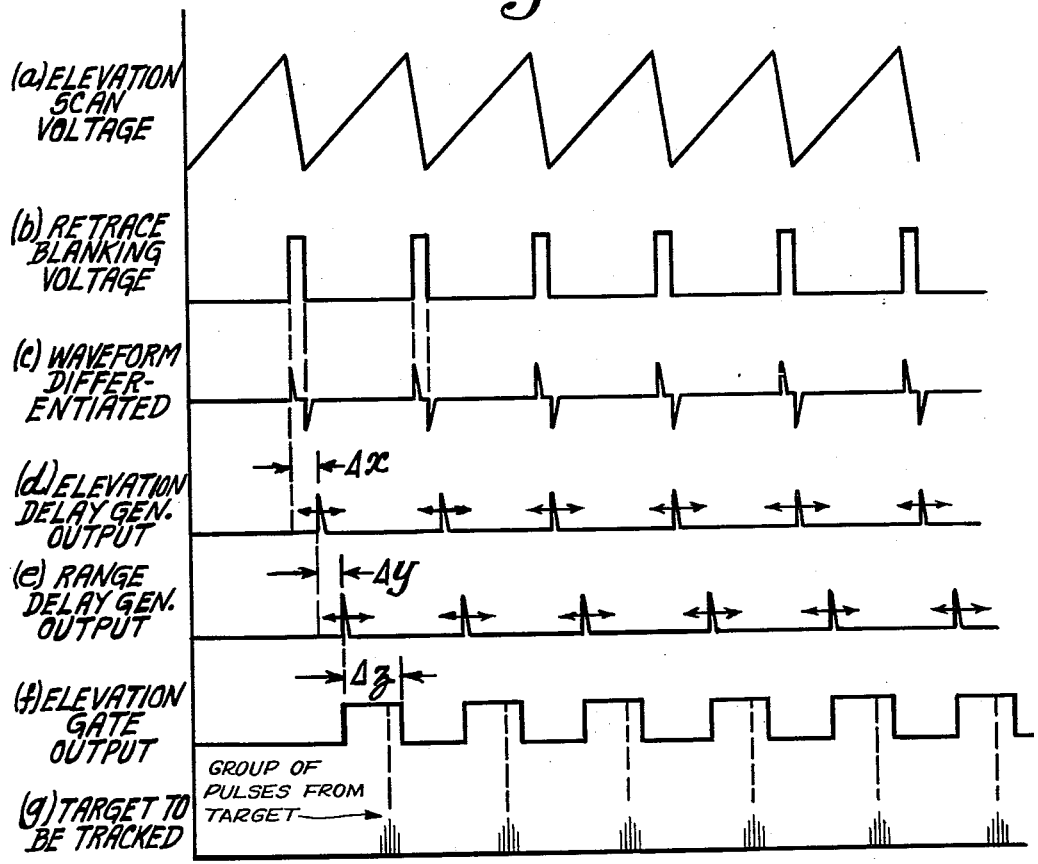
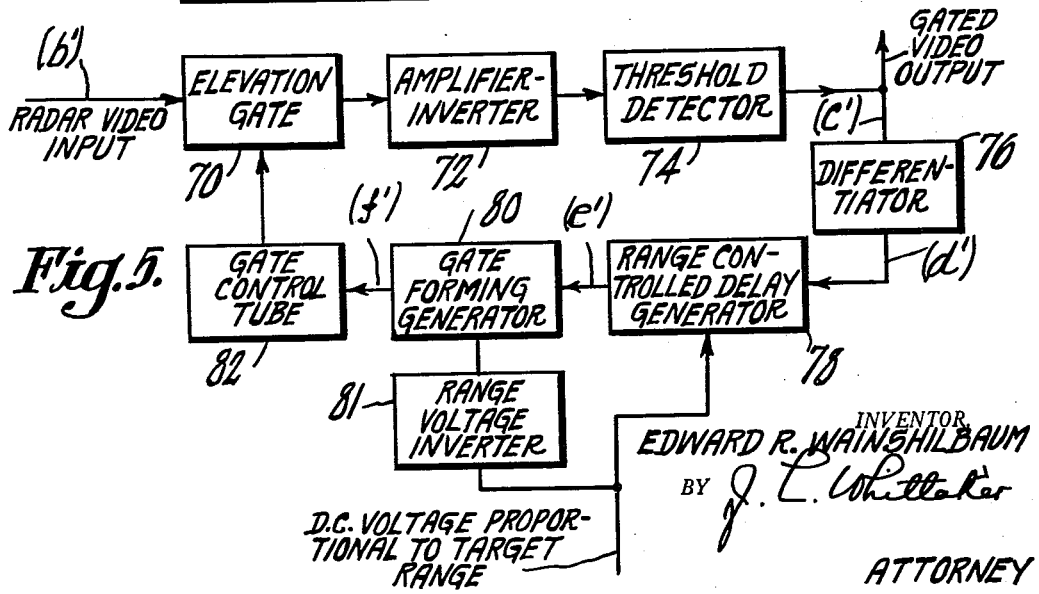

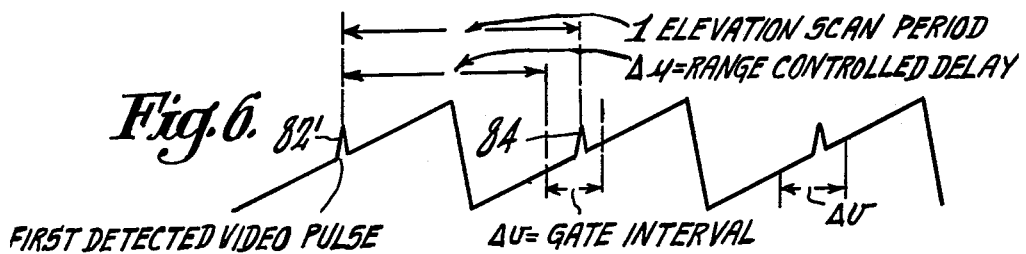
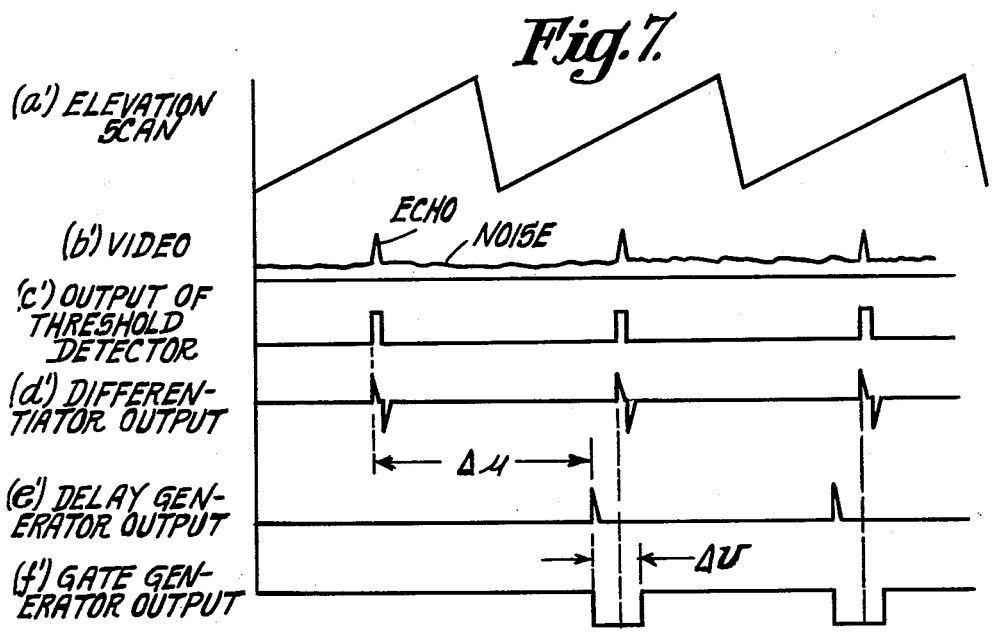
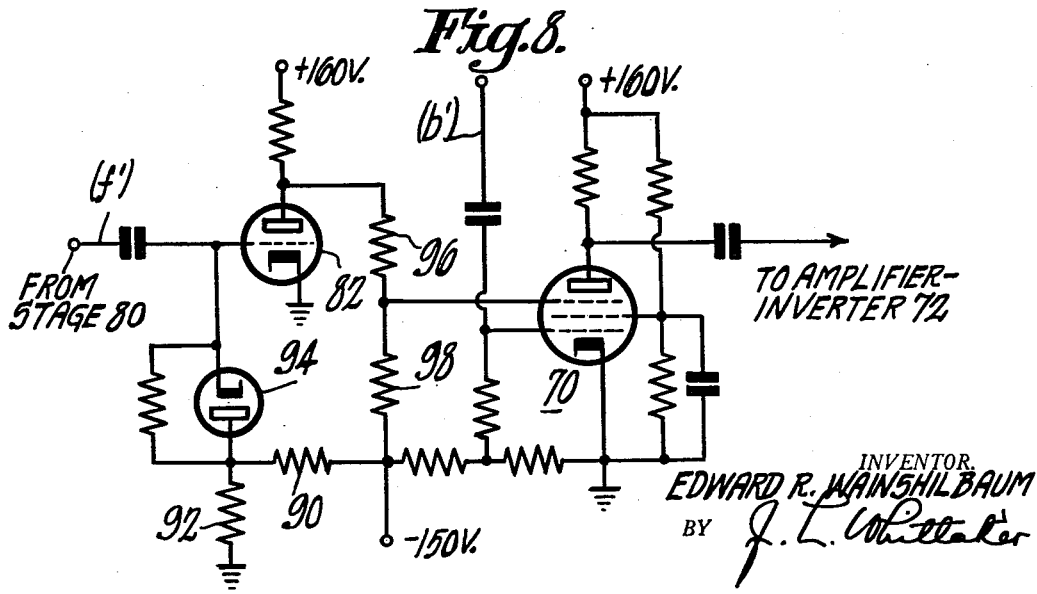

United States Patent Office 3,004,255
Patented Oct. 10, 1961

3,004,255
GATE CIRCUITS
Edward R. Wainshilbaum, Rockland, Mass., assignor to Radio Corporation of America, a corporation of Delaware
Filed Oct. 21, 1955, Ser. No. 541,915
9 Claims. (Cl. 343—7.3)

This invention relates to improved gate circuits which, while not restricted thereto, are especially useful in certain types of radar tracking systems.

In radar systems of the automatic-track-while-scan (ATWS) type, received echoes are often applied to threshold devices and the output of the latter employed to trigger tracking circuits, computers, or the like. An ATWS radar system is one which continuously scans a given volume of space and continuously provides information as to the location of targets in this volume of space. A threshold device is one which produces an output signal in response to an input signal of greater than a predetermined amplitude. It is desirable to "gate" the received echoes to lessen the possibility of noise or other extraneous impulses passing through the threshold device. The narrower the gate, the less this possibility. On the other hand, the gate must be of sufficient duration to prevent a "captured" target (an aircraft, guided missile, or the like within the gate and being tracked) from escaping the gate by violently maneuvering between successive antenna scans.

It is an object of the present invention to provide an improved circuit for generating gate pulses of optimum duration to satisfy both of the above requirements.

It is another object of the present invention to provide improved circuits for generating gate pulses of variable duration and phase.

It is another object of the present invention to provide, in a radar system which repeatedly scans a given sector of space in elevation, an arrangement for rendering the radar receiver inoperative to received pulses outside of a restricted portion of the sector scanned.

The invention includes means for generating a first series of pulses spaced substantially fixed intervals from one another and means for producing groups of second pulses, individual ones of which are spaced said substantially fixed intervals from one another. Individual ones of the second pulses occur a given interval of time after corresponding pulses of the first series. The groups of pulses are spaced substantially larger intervals from one another than said fixed intervals. (The first series of pulses may be the pulses applied to trigger a radar transmitter. The groups of second pulses may be echoes from a selected target in the path of a sector-scanned directive radar beam. As the pulse repetition frequency of the transmitted pulses is substantially greater than the radar beam scanning frequency, the groups of echoes are spaced in time from one another a substantially greater amount than a transmitted pulse from a corresponding echo.) The arrangement includes means responsive to the interval of time between pulses of the first series and corresponding second pulses for producing a control voltage having a parameter which is a function of said interval of time. (In the example above, the interval of time is proportional to range.) In one form of the invention, this voltage is a direct voltage and the parameter is amplitude. The gate signal producing means is responsive to the foregoing voltage and produces a gate signal having the same period as the repetition period of the groups of second pulses and formed with portions bracketing the groups of pulses. The gate duration is inversely proportional to the magnitude of the control voltage parameter.

In a specific embodiment of the invention in which a height-finder radar repeatedly scans a given elevation sector of space, the gate produced is not symmetrical about the actual target position. If, for example, the gate is produced during the upward portion of the scanning cycle, the interval between the leading edge of the gate and the target echo is substantially greater than that between the lagging edge of the gate and the target echo. The portion of the gate which lags the echo is made of shorter duration, as the target being tracked (aircraft or the like) cannot climb as rapidly as it can dive.

The invention will be described in greater detail with reference to the following description taken in connection with the accompanying drawing in which:

FIGURES 1 and 2 are graphs used to explain the mode of operation of the present invention;

FIGURE 4 is a drawing of various wave forms present in the circuit of FIGURE 3;

FIGURE 5 is a block diagram of a second embodiment of the present invention;

FIGURE 6 is a drawing used to explain the performance of the circuit shown in FIGURE 5;

FIGURE 7 is a drawing of the waveforms present at various points in the circuit of FIGURE 5; and FIGURE 8 is a schematic circuit diagram of a portion of the circuit shown in FIGURE 5.

Throughout the figures similar reference numerals refer to similar elements.

Referring now to FIG. 1, assume an aircraft is flying at a given altitude as indicated by dot-dash line 10. Assume also that the radar system is located at the intersection of the range and altitude axes. This system includes means for radiating a directive beam of energy at targets and receiving echoes from objects in the path of the radiated beam. It also includes means for cyclically scanning the directive beam in elevation through a given sector of space.

If an aircraft is flying at constant speed along the line 10, the distances $AB=CD=EF$ and the lines drawn from the radar system which encompass these distances subtend unequal angles $\alpha$, $\beta$ and $\nu$, respectively. The sector of elevation scanned by the radar system lies in the same plane as angles $\alpha$, $\beta$ and $\nu$. From the foregoing, it can be seen that minimum elevation gate duration may be achieved by decreasing the gate width as the range of the target of interest increases.

An aircraft can dive substantially more rapidly than it can climb. Therefore, the elevation gate duration may be decreased still further without danger of the aircraft escaping from the gate between successive elevation scans by reducing the interval between the echo and the lagging edge of the gate (lag time). Accordingly, the gate configuration of optimum proportions should be as shown in FIGURE 2. In this figure the target is assumed to be at a given elevation angle which remains constant. The start of the gate, indicated by line 12, occurs an interval of time $(\Delta x+\Delta y)$ after the start of the elevation sweep. As can be seen from the figure when the elevation angle is constant, $\Delta x$, which is proportional to elevation angle is also constant. $\Delta y$ is proportional to the range of the target being tracked. The gate duration, that is, the interval of time between lines 12 and 14 varies inversely with the range of the target being tracked. The lead time, that is, the interval between lines 12 and 16 is substantially greater than the lag time, that is the interval of time between lines 14 and 16.

Figure 3:
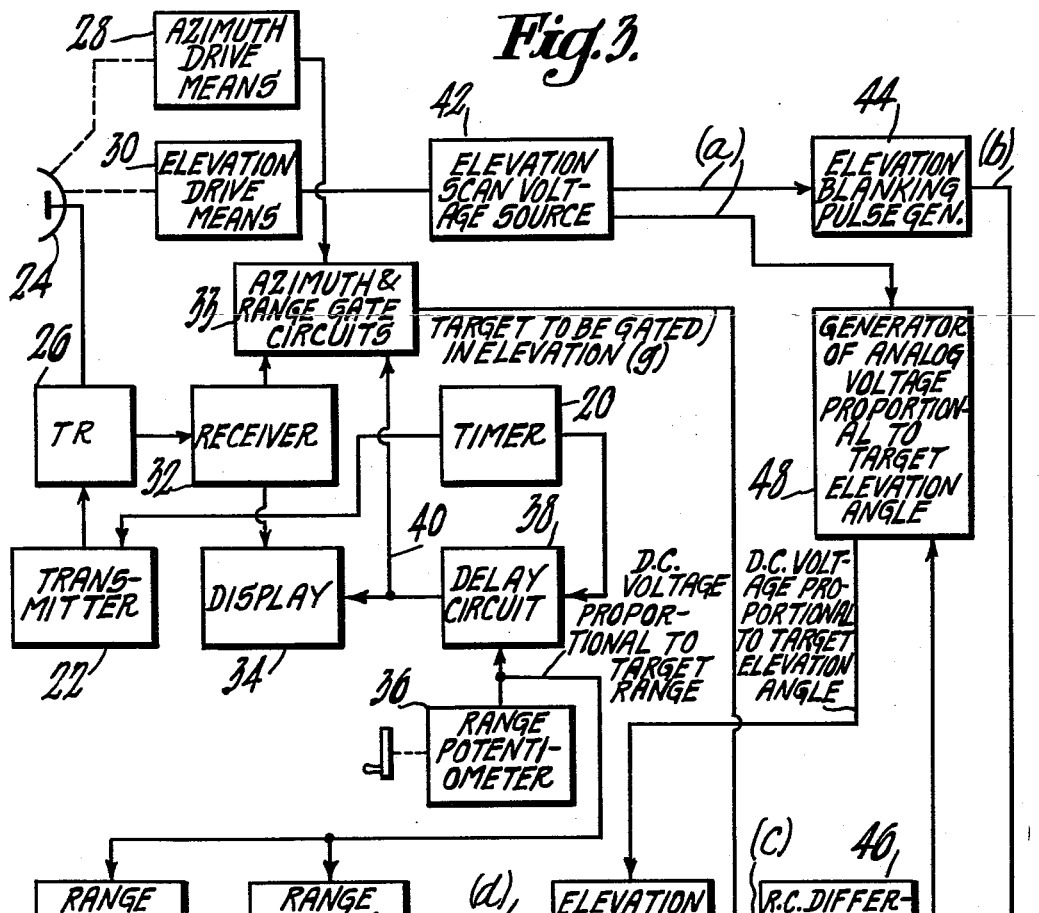
FIGURE 3 is a block circuit diagram of one form of the present invention.

FIGURE 3 shows in block circuit diagram form one embodiment of the invention which automatically gates a selected target in the manner described in the foregoing paragraphs. Only those portions of the entire radar system of immediate interest are illustrated. Since all of the blocks making up the system are per se well known to those skilled in the art, they are not described here in detail.

The radar system shown in FIG. 3 is one which both scans in azimuth and nods in elevation. Normally, the elevation scan rate is substantially greater than the azimuth scan rate. Timer 20, which may include a stable oscillator and a means for converting its output to pulses spaced fixed intervals from one another, is the central time base of the radar time system. Its output pulses are applied to the radar transmitter 22 and the latter supplies high-power pulses of radio frequency energy to antenna 24 through transmit-receive device 26. Antenna 24 is driven in azimuth by azimuth drive means 28 which may comprise a motor or the like and driven in elevation at a substantially higher rate by elevation drive means 30 which may also comprise a motor or the like. Antenna 24 radiates a directive beam of energy and receives echoes from targets in the path of the radiated beam. These echoes are applied through transmit-receive device 26 to receiver 32.

In a form of the invention employed for automatically tracking certain targets of interest, circuits 33 are provided for gating the video output of the receiver in azimuth and range. The azimuth gate circuit may, for example, include an electron tube circuit for generating an enabling gate of fixed or variable duration and means such as cams on the azimuthally rotatable antenna for triggering the electron tube circuit. The enabling gate subtends a small portion of the sector scanned in azimuth, say 10° of the 360° scanned. Since numerous circuits of this type are very well known in the art, it is believed to be unnecessary to give further details. The range gate portion of block 33 may also comprise an electron tube circuit responsive to delayed pulses from timer 20 for initiating the gates. In one form of range-gate circuit, the pulses from timer 20 are delayed an interval of time proportional to the range of a target of interest and then employed to trigger the range gate. The amount of delay may be controlled either manually or automatically. In one form of manual system, for example, pulses from timer 20 are applied through delay circuit 38 to both display 34 and the range gate portion of block 33. The pulses applied to the display intensity modulate the same and, in the case of a P.P.I. display, appear as a ring on the screen of the display having a diameter proportional to the delay inserted by delay circuit 38. Manual adjustment of range potentiometer 36 adjusts the delay which in turn adjusts the diameter of the range ring. When it is desired to gate a specific target of interest, the handwheel is adjusted until the ring is superimposed over the target echo. The delayed pulse applied over lead 40 to the range gate circuit triggers the same and the latter produces a range gate of relatively short duration which brackets the echo.

Elevation drive means 30 is mechanically or electrically connected to elevation scan voltage source 42 which may comprise a potentiometer or electron tube circuit. The output of circuit 42 is a sawtooth elevation scan voltage as shown in FIG. 4a. It may be used to provide the elevation sweep for an elevation-range (type C) radar display (not shown). Elevation blanking pulse generator 44 receives the output of the elevation scan voltage source 42 and produces a blanking voltage (see FIG. 4b) which may be employed to blank the retrace interval of the elevation scan voltage. This blanking pulse may be applied, for example, in reverse polarity to the control grid of the elevation range display. Differentiating circuit 46, which may be an RC or similar differentiating circuit, derives from the wave of FIG. 4b, the differentiated wave shown in FIG. 4c. The leading edge of the differentiated wave is used to trigger the elevation delay generator 52 as will be explained in further detail later.

The leading edge of the retrace blanking voltage is used merely as a time reference. In the embodiment illustrated in FIGURE 3 this leading edge starts the delay interval $\Delta x$ which is proportional to the elevation angle of the target being tracked. It is to be understood that the invention is not limited to the use of the leading edge of the retrace blanking pulse as the time reference. Any other recurrent pulse at or near the start of the elevation sweep could be used instead. For example, the lagging edge of the same pulse could be used or the return trace of the elevation scan voltage itself could be used.

Returning now to the upper center portion of FIG. 3, elevation scan voltage source 42 also supplies its output voltage to the means for generating an analog voltage proportional to target elevation angle 48. An analog voltage is one having a parameter, the magnitude of which represents some other quantity. In the present case, analog voltage generator 48 produces a direct voltage output having an amplitude proportional to the elevation angle of the target. The output of the receiver 32 is also applied through azimuth and range-gate circuits 33 to elevation gate 60 which in turn supplies its output through threshold detector 50 to analog voltage generator 48. The function of threshold detector 50 is to convert a video pulse occurring within the azimuth and range gates to a pulse of fixed amplitude whose leading edge coincides with the video pulse. Analog voltage generator 48 may take several forms, all well known to those skilled in the art. One form of the invention, for example, may comprise a multi-element variable gain discharge device such as a pentode. The sawtooth elevation scan voltage in such case is applied to one of the control elements such as the suppressor grid of the discharge device for varying the gain of the discharge device. The pulses of fixed amplitude from the threshold detector 50 are applied to another of the control elements such as the control grid of the discharge device. The output of the discharge device is a pulse having an amplitude proportional to the elevational angle of the target of interest. The output of the discharge device may then be integrated by a long-time constant integration circuit (contained in block 48) to obtain a direct voltage proportional to target elevation.

Elevation delay generator 52 may comprise a phantastron circuit. Alternatively, it may comprise a two-tube, monostable multivibrator in series with a differentiating circuit and clipper. The elevation delay generator 52 is triggered by the differentiated pulses in time coincidence with the leading edges of the retrace blanking voltage pulses. The direct voltage proportional to target elevation is applied in well known manner to the delay generator and controls the delay $\Delta x$ between its input triggering pulses (FIG. 4c) and its output pulses (FIG. 4d). For example, the direct voltage may be applied to the control grid of one of the multivibrator tubes to control the time it remains in its unstable state.

Elevation delay generator 52 applies its output to a second range delay generator 54 which may be similar to delay generator 52. Range delay generator 54 also receives from range potentiometer 36 a direct voltage proportional to target range. The function of delay generator 54 is to produce an output pulse an interval of time $\Delta y$ after the pulse of FIG. 4d which is proportional to the range of the target of interest. Since this circuit functions in a similar manner to elevation delay generator 52, it is believed to be unnecessary to describe the same in further detail.

Range voltage inverter 56 is also connected to receive the output of range potentiometer 36. Its function is to invert the range voltage so as to obtain a voltage inversely proportional to the range of the target of interest. The range voltage inverter may comprise a vacuum tube having a control grid connected to the range potentiometer output circuit. Alternatively, the inverted range voltage may be obtained from a dual range potentiometer.

Gate-forming generator 58 is connected to receive both the triggering pulse from range delay generator 54 and the inverted range delay voltage from stage 56. The output of the gate forming generator 58 consists of a gate signal having an enabling duration $\Delta z$ which is inversely proportional to the range of the target of interest. As can be seen from FIGS. 4f and g, the elevation gate signal brackets the target of interest in the desired manner as indicated in FIG. 2. The gate of FIG. 4f may be applied to an elevation gate stage 60 which may consist of a multi-element discharge device. The gate is applied to one of the elements and the receiver echo video output having been gated in range and azimuth in 33 applied to the other of the elements. A video output signal gated in elevation, range and azimuth is available at lead 62.

Figure 3A:
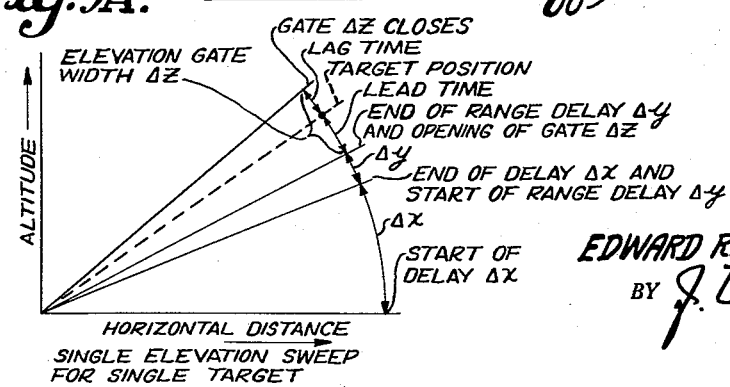
FIGURE 3A is a drawing used to explain the performance of the circuit shown in FIG. 3.

Referring again briefly to FIG. 2, and also to FIG. 3A, the various delays imparted by stages 52, 54 and 58 may be seen at a glance. The first delay $\Delta x$ imparted by elevation delay generator 52 is proportional to the target elevation angle. The second delay $\Delta y$, imparted by stage 54 is proportional to target range; and the gate duration $\Delta z$, imparted by stage 58 is inversely proportional to the range of the target.

The waveforms illustrated in FIG. 4 of the drawing are meant merely to be illustrative of the invention and are not drawn to scale. The elevation scan voltage, for example, may scan an interval of, say, from 0 to 40° in elevation. The elevation gate output 4f, on the other hand, would normally be only a small fraction of the entire elevation scan interval. Thus, for example, the target may appear for one or two degrees of the elevation scan cycle and the elevation gate duration may then be on the order of 5–7 degrees. These proportions are not shown in FIG. 4.

A second embodiment of the present invention is shown in block form in FIG. 5. The portions of the radar system not directly pertinent to the invention may be similar to the ones shown in block form in FIG. 3 and so are omitted from FIG. 5. FIG. 7 which illustrates the output waves $b'$–$f'$ of the circuit of FIG. 5 should also be referred to in the discussion which follows.

In the embodiment of FIGURE 3, the zero reference point is the start of the elevation sweep. Two delays are introduced prior to the start of the gate. One, $\Delta x$, is proportional to the elevation angle and the other, $\Delta y$, is proportional to range. The embodiment of FIGURE 5 produces its delay in a different way. The zero reference point is now the video pulse itself. The first delay interval is between the first received video pulse and the start of the gate. This delay interval is $\Delta u$. Since the detected video signal itself is the timing reference, the delay $\Delta x$ is automatically generated and is included within the delay $\Delta u$, thereby eliminating the need for a separate elevation delay control.

Before tracking has started, radar video $b'$ passes through elevation gate 70, which is wide open, through amplifier-inverter stage 72 and thence to threshold detector 74. The function of amplifier-inverter 72 is to invert the output of elevation gate 70, whereby a positive going signal is applied to the threshold detector. The threshold detector may be a biased electron tube. When an input signal overcomes the bias setting an output pulse $c'$ of fixed amplitude is produced. This output pulse is differentiated by differentiator 76 and the leading one of the differentiated signals employed to trigger range controlled delay generator 78. The range controlled delay generator may be a phantastron or the like, such as described in connection with the analagous circuit of FIG. 3. This delay generator 78 produces an output pulse $e'$ an interval $\Delta u$ after the triggering impulse applied thereto which is a function of the range of the target of interest. Gate-forming generator 80 may be a multivibrator having a single stable state. It is triggered by pulse $e'$ and produces an output gate having a duration $\Delta v$ which is inversely proportional to the range of the target of interest. It will be noted that stage 78 receives a direct voltage proportional to target range and it is this voltage that controls the delays $\Delta u$. Stage 80, on the other hand, receives from inverter stage 81 a direct voltage inversely proportional to range to control the delay $\Delta v$. The gate $f'$ thus produced is applied through gate control tube 82 and functions to gate the video information received during succeeding elevation scan cycles.

In FIGURE 7, $\Delta v$, the gate interval, is the same as $\Delta z$, the gate interval in FIGURE 4. The width of the gate, in each case, as shown in FIGURE 2, varies inversely with the range of the target being tracked. In each case, the lead time exceeds the lag time. $\Delta v$ is not equal to an elevation scan. It is only a fraction—say $\frac{1}{10}$ or so of the total elevation scan. See FIGURES 7$a'$ and 7$f'$ in this connection.

The mode of operation of the circuit of FIG. 5 is illustrated in the waveforms shown in FIG. 6. The first detected pulse 82' passes through the elevation gate. The second detected pulse 84 is bracketed by a gate having an interval $\Delta v$ which is inversely proportional to the range of the target producing pulse 84. As in the case of the embodiment of FIGURE 3, the circuit constants are so chosen that the gate leads the echo by an amount substantially greater than the amount it lags the echo, whereby the target being tracked cannot escape from the gate between elevation scans by diving, climbing or exercising similar maneuvers.

FIG. 8 illustrates in circuit diagram form some of the stages shown in block form in FIGURE 5. Elevation gate tube 70 comprises a pentode and the radar video input $b'$ is applied to the control grid of the pentode. Before tracking has started, the pentode is wide open and the signal applied to its control grid is amplified and passed to the amplifier-inverter stage 72. The gate generated by gate forming generator 80 is applied to the control grid of gate control tube 82. Gate control tube 82 is normally cut off by the negative voltage applied to its control grid from the junction point of voltage divider 90, 92. The positive portion of the gate signal applied to the control grid of tube 82 overcomes this negative bias voltage. The function of diode 94, which may be a crystal diode or the like, is to clamp the gating signal to the bias point, assuring proper operation of the gate control tube as the gating duty cycle changes.

Referring again briefly to FIG. 7, it may be seen that the portion of the gate bracketing the target of interest is negative going. Thus, during the gate interval $\Delta v$, tube 82 is maintained cut off. During the remainder of the interval (the positive portion of waveform $f'$ in FIG 7), the bias on the control grid of tube 82 is overcome and the latter conducts. The resultant voltage which is produced at the junction point of voltage divider network 96, 98, is applied to the suppressor grid of pentode 70 and the latter is cut off. Thus, once tracking has started, elevation gate tube 70 conducts only during the gated interval $\Delta v$. The gate brackets the tracked pulse in the desired manner as already explained in detail.

What is claimed is:

1. A gate circuit comprising, in combination, means for generating and transmitting to a target a series of first pulses spaced substantially fixed intervals of time from one another; means for receiving periodically recurring groups of second pulses that are produced in response to the arrival of said first pulses at said target, individual ones of which are spaced said fixed intervals of time from one another, and occur given intervals of time after the corresponding ones of said first pulses, the spacing between groups of pulses being substantially greater than said intervals; means for producing a voltage having a parameter which is a function of said given intervals of time; and means responsive to said voltage and to said groups of pulses for producing a gate signal having the same period as said groups of pulses and formed with portions bracketing said groups of pulses of a duration inversely proportional to the magnitude of said parameter.

2. A gate circuit comprising, in combination, means for generating and transmitting to a target a series of first pulses spaced substantially fixed intervals of time from one another; means for receiving periodically recurring groups of second pulses that are produced in response to the arrival of said first pulses at said target, individual ones of which are spaced said fixed intervals of time from one another, and occur given intervals of time after the corresponding pulses of said first series; the spacing between groups of pulses being substantially greater than said fixed intervals; means for producing a direct voltage having an amplitude which is a function of said given intervals of time; and means responsive to said voltage and to said groups of pulses for producing a gate signal having the same period as said groups of pulses and a duration which includes the duration of said groups of pulses and is inversely proportional to the amplitude of said direct voltage.

3. In combination, antenna means for radiating pulses in a directive beam pattern and receiving said pulses after reflection from objects in the path of said beam pattern; means for scanning said beam pattern through a predetermined angle in space; gate circuit means; receiver means connected to receive said pulses after reflection from objects for applying said pulses to said gate circuit means; and gate means operatively associated with said gate circuit means for rendering said gate circuit means operative for a portion of the time said beam pattern is scanned, including the period during which echoes from a selected one of said objects are received, which is an inverse function of the range of said selected object.

4. In combination, antenna means for radiating energy in a directive beam pattern and receiving said energy after reflection from objects in the path of said beam pattern; means for scanning said beam pattern through a predetermined angle in space; gate circuit means for receiving said energy after reflection from said objects; and gate forming means operatively associated with said gate circuit means for rendering said gate circuit operative for a portion of the time said beam pattern is scanned, including the period during which energy from a selected one of said objects is received, which is an inverse function of the range of said selected object.

5. a gate circuit comprising, in combination, means for generating and transmitting to a target a series of first pulses spaced fixed intervals from one another; means for receiving periodically recurring groups of second pulses that are produced in response to the arrival of said first pulses at said target, individual ones of which are spaced said fixed intervals from one another, and occur given intervals of time after the corresponding pulses of said first series; means for producing a voltage having a parameter which is a function of said given interval of time; elevation gate circuit means receptive of said periodically recurring groups of pulses; delay generator means receptive of the pulses passed by said elevation gate circuit means and controlled by said voltage having a parameter which is a function of said given interval of time for producing an output pulse an interval of time after a group of pulses applied thereto by said elevation gate circuit means which is a function of said parameter; gate generator means connected to receive said output pulse and controlled by said voltage having a parameter which is a function of said interval of time for producing a gate pulse having a duration including the period of time occupied by a group of second pulses which is inversely proportional to said parameter; and means for applying said gate signal to control said elevation gate circuit means.

6. A gate circuit as set forth in claim 5, wherein said elevation gate circuit means includes a multi-element electron discharge device, said gate signal being applied to one of the elements of said discharge device, and said groups of second pulses being applied to another of the elements of said discharge device.

7. In combination, antenna means for radiating pulses in a directive beam pattern; means for periodically scanning said beam pattern in the up direction through a given elevation sector; means for receiving groups of pulses reflected from objects in the path of said beam pattern, the group repetition frequency of said pulses being the same as that of said scanned beam pattern; and means responsive to said groups of pulses for gating said receiver means so as to render the same operative for a duration during a scanning period, including the time of occurence of a group of pulses, which leads said time of occurrence substantially more than it lags the same.

8. In combination, antenna means for radiating pulses in a directive beam pattern; means for periodically scanning said beam pattern through a given elevation sector; means for receiving groups of pulses reflected from an object in the path of said beam pattern; means for producing gate pulses at a recurrence frequency which is the same as that of the succeeding groups of pulses; means for adjusting the duration of said gate pulses to make the same inversely proportional to the range of said object; and means for delaying said gate pulses for an interval directly proportional to the range of said object.

9. In the combination as set forth in claim 8, further including circuit means for adjusting said delay interval to asymmetrically position said gate pulses over said group of pulses with the leading edge of each gate pulse spaced substantially further from its group of pulses than the lagging edge thereof.

References Cited in the file of this patent

UNITED STATES PATENTS 2,782,411    McNaney _____ Feb. 19, 1957